United States Patent [19]
Nystuen et al.

[11] 3,937,981
[45] Feb. 10, 1976

[54] WASH PROGRAM SELECTION AND INDEXING APPARATUS

[75] Inventors: Marcus I. Nystuen, St. Paul; Roger L. Dillon, Cottage Grove, both of Minn.

[73] Assignee: Economics Laboratory, Inc., St. Paul, Minn.

[22] Filed: Mar. 22, 1974

[21] Appl. No.: 453,716

[52] U.S. Cl............. 307/141; 134/58 R; 200/38 C; 317/154
[51] Int. Cl.²................. H01H 43/00; H01H 47/00
[58] Field of Search......... 200/38 B, 38 C; 307/139, 307/141, 141.4; 68/12 R; 134/58 R, 58 D, 58 DL, 56, 57 R; 318/487, 284; 317/137, 139, 141, 154

[56] References Cited
UNITED STATES PATENTS

| | | | |
|---|---|---|---|
| 3,109,074 | 10/1963 | Lewis et al. | 200/38 C |
| 3,125,105 | 3/1964 | Geiger | 307/141.4 X |
| 3,138,724 | 6/1964 | Wood | 307/141 |
| 3,215,791 | 11/1965 | Fontaine | 200/38 C |
| 3,260,866 | 7/1966 | Martin | 307/141 |
| 3,319,144 | 5/1967 | Clark | 307/141.4 X |
| 3,454,784 | 7/1969 | Wantz et al. | 307/141 |
| 3,819,886 | 6/1974 | Homan et al. | 200/38 C X |

Primary Examiner—James R. Scott
Attorney, Agent, or Firm—Merchant, Gould, Smith, Edell, Welter & Schmidt

[57] ABSTRACT

Apparatus and logic circuitry for selection of a desired wash program in a laundry machine in which multiple programs are available and occupy zones of varied extent on a continuous program surface. An indexing surface is connected to and moves with the program surface. The indexing surface is divided into a plurality of tracks, each of which is marked to identify the position and extent of a distinct program encoded on the program surface. Individual pushbutton selection switches provide power to enable individual sensing switches paired with the tracks. An enabled switch senses the markings defining the program selected by actuation of a particular pushbutton. The pushbutton switch enabling an individual sensing switch also actuates an indexing drive which rapidly and automatically drives the indexing surface to a position where the enabled sensing switch senses a program point corresponding to the beginning of the selected program. The sensing switch then disconnects indexing drive and engages a timer motor, also enabling means responsive to the information encoded on the program surface so that the selected program may be performed.

28 Claims, 5 Drawing Figures

WASH PROGRAM SELECTION AND INDEXING APPARATUS

BACKGROUND OF THE INVENTION

This invention relates generally to program controllers for machines whose operation may involve any one of a number of distinct cycles or programs and more particularly concerns improved indexing and program selection apparatus suitable for use in commercial or institutional laundry machines.

It is typical in existing laundry machines for controllers to have a manually rotatable dial marked so that various sectors of the dial identify various distinct wash programs, formulas, or cycles. Such dials are often fixed to rotatable shafts on which a plurality of cams engage a gang of individual switches for controlling various mechanisms and subsystems within the machine. After the dial is manually rotated to the operator-selected sector, a timer motor which drives the dial shaft and cams through that section is engaged. In this manner, the steps defined by portions of the cams in that sector are performed by the machine. In a machine having a number of special purpose cycles, some of which may involve addition of special additives to deal with hard-to-remove stains or other environmental conditions, it is particularly important that the machine perform exactly the desired program. Often the omission of one step from a cycle or the inclusion of an unwanted step or additive may render the desired program ineffective or even harmful to the material being laundered. Since the program is defined by manual selection of a particular dial sector, errors of this type are likely. Another disadvantage of conventional machines having a manually settable circular dial used for program selection is that the number of easily distinguishable programs available is significantly limited.

In addition, a number of manual controllers have program selection dials which operate independently of the mechanism for starting machine operation. With such machines it is quite possible to forget to select the proper program before actuating the machine. This will result in a repeat of the program previously selected.

The indexing and selection apparatus of the present invention overcomes these disadvantages in a system in which improved flexibility and an ability to select many distinct programs is combined with simplified controls which accurately and repeatably cycle through all steps defining a particular program without deletion or addition of unwanted steps.

SUMMARY OF THE INVENTION

In accordance with the invention, program indexing and selection apparatus is provided for a laundry machine having a movable continuous program surface with zones of differing extent spaced about said surface, each zone defining a plurality of laundry program functions collectively defining a distinct wash program. The laundry machine has a timer motor for moving the program surface past control means responsive to the steps encoded thereon, which means in turn actuates the laundry machine to perform the encoded steps. Means defining a movable continuous indexing surface associated with the program surface and maintaining a fixed positional relationship thereto is also provided. The indexing surface has distinct index points thereon which have a predetermined positional relationship to the beginning and end of the zones defining distinct wash programs.

A plurality of individual sensing means are mounted above the indexing surface. Each such sensing means is adapted to sense the index points corresponding to the beginning and end of a different distinct wash program encoded on the program surface. Connected to the individual sensing means are program selection means. The program selection means function to enable a sensing means corresponding to a selected program. The program selection means also energizes an indexing drive which moves the program surface and indexing surface with respect to the individual sensing means. The enabled sensing means eventually senses an index point on the indexing surface. The sensed point is positioned so that, when it is sensed, the beginning of the selected program will be aligned with the sensitive area of the control means. When the index point is sensed, the sensing means causes the indexing drive to be discontinued. The normal or timer motor drive is then used to drive the program surface and the control means are enabled so that they can sense and respond to the zone occupied by the selected program.

Depending upon the particular embodiment of the present invention, when the program is complete and the entire zone has been surveyed by the control means, a second index point on the indexing surface corresponding to the end of the selected program may be sensed by the sensing means and used either to de-energize the system or to reconnect the indexing drive to drive the program surface back to an initial or "ready" position, after which a limit stop de-energizes the drive.

Selection and indexing apparatus according to the present invention thus requires the machine operator only to select the proper program. After the initial choice is made, the apparatus searches for and finds those portion of the program surface which defines the selected program and automatically cycles the laundry machine through the entire series of steps which define the selected program.

BRIEF DESCRIPTION OF THE DRAWINGS

Additional advantages and desirable features of the present invention will be better understood after consideration of the drawings and the detailed description relating to them. Referring particularly to the drawings, wherein the use of like reference numerals throughout the several views is indicative of like elements.

The invention will now be described in connection with preferred embodiments thereof. It will be understood, however, that the invention is not limited in scope to any particular embodiment. On the contrary, all alternatives, equivalents, and modifications which do not depart from the spirit and scope of the invention as defined by the claims are covered.

DETAILED DESCRIPTION OF THE INVENTION

Figures 1, 2, 3:
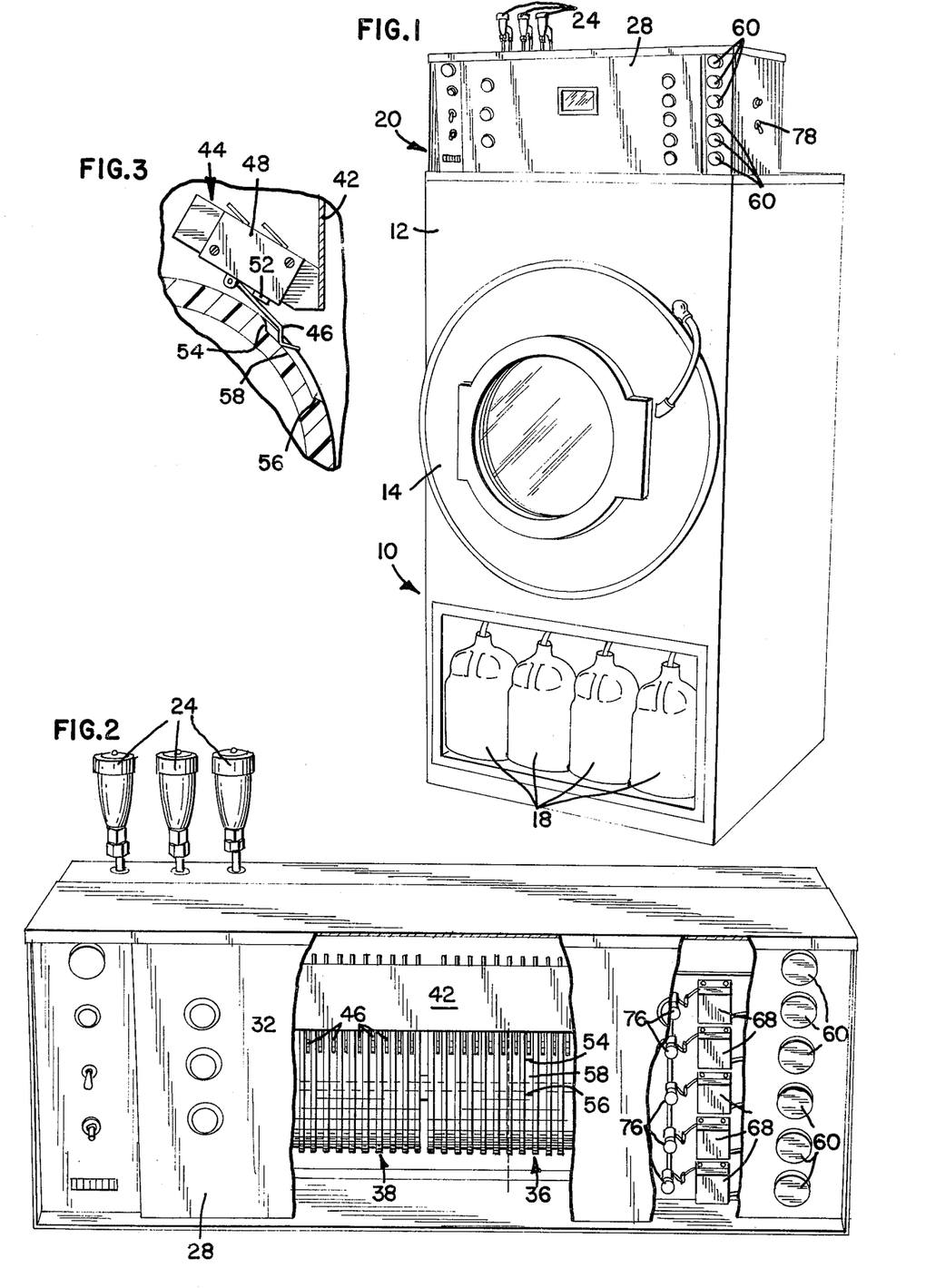
FIG. 1 is a view in perspective of a laundry machine having a wash cycle controller incorporating one embodiment of the program selection and indexing apparatus of the present invention.
FIG. 2 is a perspective view of a wash cycle controller as shown in connection with FIG. 1, portions thereof being cut away to show the structure and particular features of an embodiment of the present invention.
FIG. 3 is a greatly enlarged view in side elevation of a portion of the internal structure of the controller shown in FIG. 2.

Turning first to FIG. 1, there is shown in perspective a laundry machine generally designated 10. Laundry machine 10 has a body 12 of substantially rectangular exterior construction. In the front wall of the body 12 is a loading door 14 with a circular window which provides a view of the load and the laundry cycle in progress. Located in a recessed area below loading door 14 are a plurality of detergent or additive containers 18. Each container has a tube leading from it to an internal injection system which controls injection of detergents and additives for the various cycles or programs which the machine is capable of performing. Laundry machine 10 has a wash cycle controller 20 mounted thereon. Wash cycle controller 20 contains basic program logic and circuitry which control the operations of the laundry machine as well as indexing and selecting apparatus of the present invention, all housed in a generally rectangular enclosure. Protruding from the top surface of wash cycle controller 20 are three syphon breakers 24. These syphon breakers prevent laundry products or solution from backing up into the fresh water supply line in case of reduced or negative pressure upstream of the syphon breakers.

Wash cycle controller 20 is shown in more detail in FIG. 2. Controller 20 has a front panel 28, portions of which are broken away in FIG. 2 to show its internal structure. In the preferred embodiment, located to the left of panel 28 are toggle switches, an indicator light and a pushbutton generally designated at No. 21 which provide basic laundry machine functions. Since these elements are not essential to or required for an understanding of the structure and operation of the present invention, their function will not be discussed in detail. They may, for example, be power switches, stop switches, indicator lights or other elements which provide emergency deenergization, program cancelling or other common control functions.

Wash cycle controller 20 has housed therein means having a movable continuous program surface, which in the present embodiment is a cylindrical controller drum or roll chart generally designated 32. Cylindrical controller drum 32 is divided into a number of laterally spaced longitudinal tracks 34 which extend around the exterior surface thereof. A number of the individual tracks 34 on the right side of drum 32 shown in FIG. 2 comprise an indexing surface generally designated 36. A larger number of the tracks 34 on the left side of drum 32 in FIG. 2 comprise the program surface 38. For illustrative purposes, a dotted line 37 in FIG. 2 divides the program and indexing surfaces.

Located immediately above drum 32 is a switch head 42 carrying a plurality of individual sensing means or sensing switches 44, one for each of the individual tracks 34 on drum 32. Each of switches 44 has an actuator finger or lever 46 which is spring biased away from its respective switch body 48 by a spring loaded actuator button 52. Each of switch bodies 48 is affixed to switch head 42 and positioned so that its actuator finger 46 may ride along the contour of its associated individual track 34. The switches are adjusted so that changes in the contour of the track affect the position of actuator fingers 46, resulting in switch travel and actuation due to depression and extension of actuator buttons 52.

The individual switches which follow tracks on program surface 38 control various steps in a wash or laundry program. Typical of the types of functions which might be controlled by these switches are the amount of detergent added, the time detergent is injected, wash, spin, rinse and cycle times, water temperatures, extraction temperatures, injection of solvents or soak additives, drain energization, and agitation. Tracks controlling each of these parameters for distinct wash program may have varying contours. When drum 32 is rotated at a time-dependent rate by a timer motor, controlled on and off times for the program switches result. It will thus be understood that by varying the contour of the individual tracks on the program surface 38, a wash program is in effect encoded on the surface.

For a laundry machine of the type shown in FIG. 1, selectability of any one of a large number of distinct wash programs is desired. For this purpose, program surface 38 may be divided up into a number of zones upon which are encoded the steps which make up individual wash programs. These zones may overlap; i.e., have common steps. For distinctness, however, in the embodiment described the zones will differ in extent about the periphery of the 360° program surface. As an example, if five programs having no common steps were desired, each requiring the same laundry time, each program would occupy program surface corresponding to approximately 72° of the total 360° of the arc of the drum.

With most machines, it will be desired to have programs of varied extent including various functions and different function sequences, all of which give the laundry machine flexibility and utility. The desired programs will therefore be encoded on the program surface in zones of varying extent about the periphery of the controller drum 32.

Indexing surface 36 has a plurality of individual tracks designed for use in indexing and selection of the programs encoded on program surface 38. Each of the individual tracks has index points which correspond to the beginning and end of the particular program indexed by that track. In the embodiment shown, these index points are abrupt changes in the contour of the individual track. These abrupt changes in contour are identified as 54 and 56 in FIG. 3, which shows a cut away of controller drum 32 revealing the contour of an individual track 34. Depending on the switching convention chosen, the program length may be indicated either by a groove or by a protrusion on the track. In the particular embodiment shown in FIGS. 1–3 a cut-out portion (one of lesser radial extent than the remainder of the track) defines the extent of the particular program indexed by the track.

In the embodiment shown the sensing switches which follow both program and indexing tracks have substantially parallel actuator fingers. Therefore, depressed portion 58 of the indexing track shown in FIG. 3 defines a wash program covering a zone on the program surface 36 defined by lines parallel to the axis of drum 32 through program points 54 and 56.

Controller drum 32 is rotatably driven, either by a timer motor or by an indexing drive motor (not shown in FIG. 1–3). The timer motor provides drive at a relatively slow rate, for example, one complete revolution of drum 32 in 90 minutes. The indexing drive motor will drive at a considerably faster rate, to eliminate delay between selection and wash cycle performance. It may drive at a rate of 0.5 —3 R.P.M.

To the right of front panel 28 is a means for program selection in the form of a plurality of pushbutton switches 60. Individual pushbutton switches 60 may, for convenience, be labeled to identify the individual program they represent or the type or kind of laundry to which the program is suited. Corresponding to each pushbutton 60 is one of a plurality of program relays 68. Among other functions, program relays 68 provide continuous energization to the sensing switch corresponding to a selected program despite release of the associated pushbutton switch 60. Connected to each of program relays 68 is one of a number of program indicator lights 76. During operation of the indexing and selection apparatus of the present invention and performance of the selected program, indicator lights identify the program chosen.

Wash cycle controller 20 has a right side panel shown in FIG. 1 which may contain additional special purpose switches. In particular, in the embodiment shown in FIG. 1, a reset switch 78 is shown. Reset switch 78 provides a means of returning the program surface to an initial or "ready" position after a program has been cancelled midway or interrupted as a result of power loss.

Figure 4:
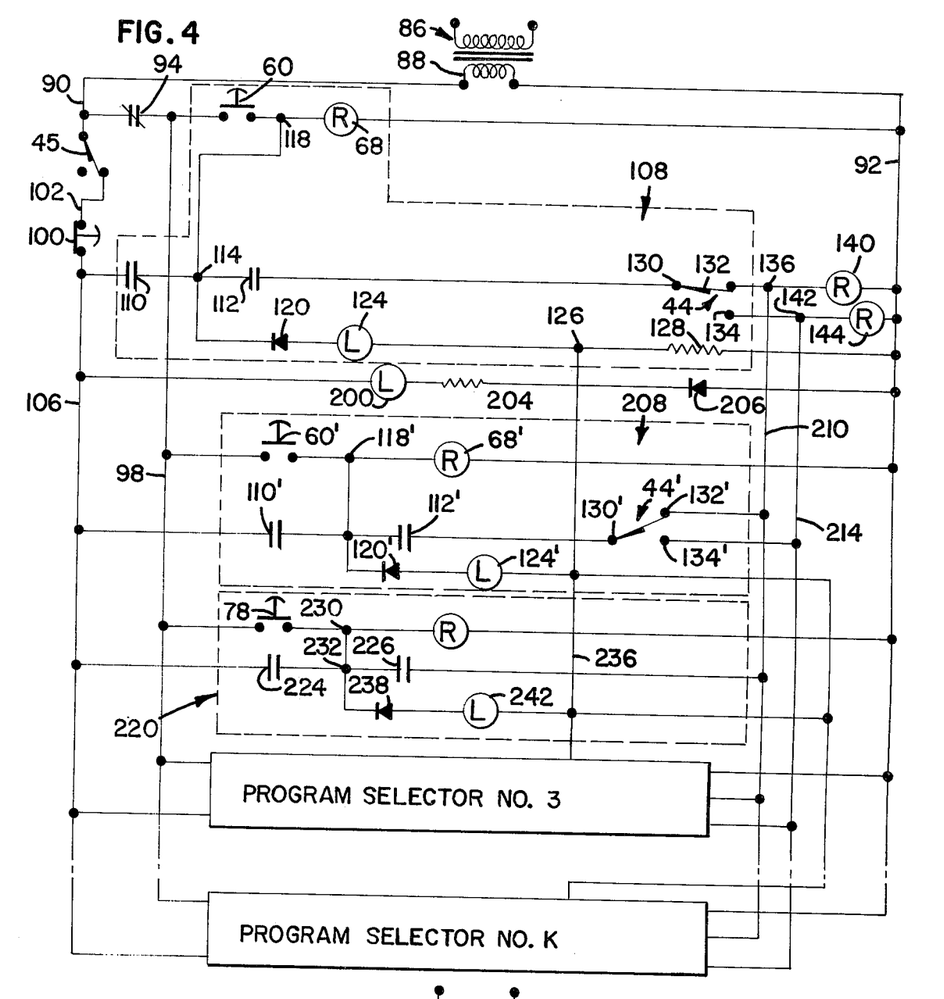
FIG. 4 is a schematic diagram illustrating the logic circuitry of the indexing and selection apparatus of the present invention.
Figure 5:
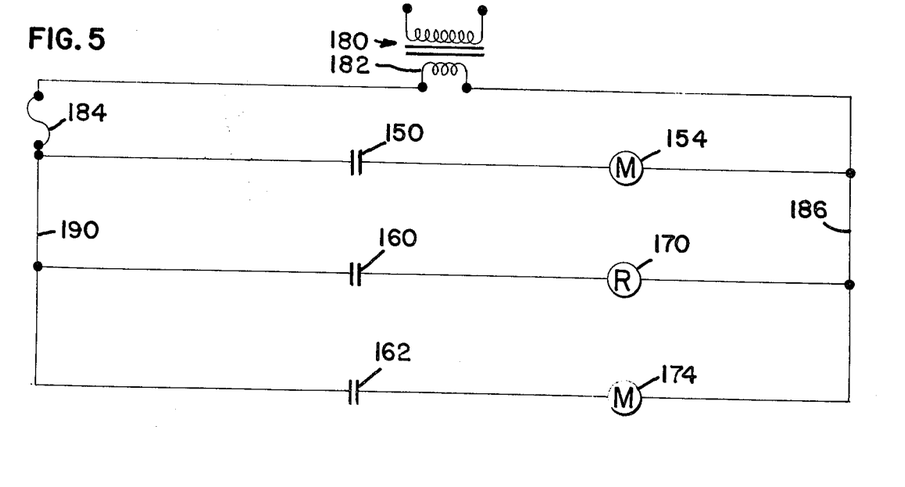
FIG. 5 is a simplified electrical schematic diagram showing essential wash controller mechanisms controlled by the indexing and selection apparatus and the interaction of the apparatus with the laundry machine.

The operation of the system will be best understood after reference to the elements shown in electrical schematics of FIGS. 4 and 5. Therefore description of operation of the structure of FIGS. 1–3 will be deferred until these figures have been described. In FIG. 4, a control power source in the form of a step-down transformer 86 having a secondary winding 88 is shown. Secondary winding 88 provides power for the selection and indexing apparatus via a pair of power leads 90 and 92. Connected to power lead 90 through a set of normally closed relay contacts 94 is a power bus 98. Power lead 90 is also connected to one terminal of a single pole, double throw, spring biased limit stop switch 45 which may be mounted on switch head 42 in the same manner as sensing switches 44 shown in FIG. 3. Limit stop switch 45 disconnects power from relays which actuate the timer motor and indexing drive motor and drive the controller drum 32. Limit stop switch 45 is mounted directly above and has an actuator finger in physical contact with one of the tracks 34, designated as a limit stop track on controller drum 32. The limit stop track has a contour such that switch 45 opens to disconnect power to the drive relays at a convenient zone on the drum where no program is encoded on surface 38. A convenient placement for the index point or contour which actuates limit stop switch 45 is parallel to a blank zone of program surface 38 following the contours which define the encoded programs.

Connected between one of the contacts of limit stop switch 45 and one side of a cancel switch 100 is a connective link 102. Cancel switch 100 is a pushbutton switch used to disconnect power to the timer motor driving drum 32 in situations where it becomes necessary to stop the machine at an intermediate point in a program. Connected to the opposite side of cancel switch 100 is a power bus 106. Power bus 106 is used to provide power for the indexing drive motor and timer motor relays after release of a program selection pushbutton switch 60 makes power unavailable from lead 90 and bus 98.

A dotted line block generally designated 108 surrounds and defines the program selection circuitry for an individual program, "Program Selector No. 1". This circuitry includes a pushbutton switch 60 (physically shown in FIGS. 1 and 2) connected in series with the coil of an individual program relay 68 between power bus 98 and power bus 92. Relay 68 performs a "hold-in" function for the selection circuitry. It has two pair of normally open contacts 110 and 112 within the block 108. Contacts 110 are connected between power bus 106 and a junction point 114. Also connected to junction point 114 is a conductor 116 the other end of which is connected to a junction point 118. Junction point 118 is connected between pushbutton switch 60 and relay coil 68. Connected in series between junction point 114 and power bus 92 are a diode 120, an indicator light 124 and a current limiting resistor 128. When selection of Program 1 is made by depressing pushbutton 60, power is provided through switch 60 to pull in relay 68. This closes normally open contacts 110 and provides an alternate path for power to diode 120, indicator light 124 and current limiting resistor 128. Indicator light 124 is illuminated to indicate that the selector circuit for Program 1 is energized. Light 124 will remain energized after manual release opens switch 60 by means of the alternate path through contacts 110.

Also connected to junction point 114 through normally open contacts 112 of relay 68 is the common terminal 130 of a spring biased sensing switch 44. Switch 44 is one of the switches, physically shown in FIGS. 2 and 3, having a actuator finger or lever which rides on one of the individual program indexing tracks 34 on indexing surface 36. Depending on the contour of the track to which actuator finger 46 responds, switch 44 may be in a state conducting from common 130 to a first terminal 132 or to a second terminal 134. Connected between terminal 132 and power bus 92 through a junction point 136 is an indexing motor relay 140. Connected between junction point 134 and power bus 92 through a junction point 142 is a timer motor relay 144. Indexing motor relay 140 has a pair of normally open contacts 150 shown in FIG. 5 through which power to indexing motor 154 must pass.

Therefore, when sensing switch 44 is enabled, either by depression of said pushbutton 60 or pull-in of relay 68, power is provided to terminal 130. Switch 44, when in the position shown, energizes the coil of relay 140, closing contacts 150 and driving indexing motor 154. On the other hand, when switch 44 is in a position which conducts between terminals 130 and 134 and contacts 110 and 112 are closed, timer motor relay 144 is energized. Relay 144 has two pair of normally open contacts 160 and 162 shown in FIG. 5. Pull-in of relay 144 closes contacts 160 and 162 and provides paths through which power may be distributed through a main control relay 170 and a timer motor 174.

Control relay 170 is the main control relay which enables switches riding on tracks on program surface 38 to respond to the contours of that surface to perform the steps in various of the wash programs encoded on the surface. Timer motor 174 provides a time-dependent drive of the program surface at a considerably slower speed than indexing motor 154 as previously mentioned.

Completing the simplified diagram of FIG. 5, which shows the relationship between the selection and indexing logic circuitry of FIG. 4 and basic wash controller elements, a power source or transformer 180 has a secondary 182, one terminal of which is connected to a fusable link 184. The other terminal of secondary 182 is connected to a power bus 186. Fusable link 184 is connected to power bus 190. Connected in parallel between power bus 190 and power bus 186 are indexing motor 154 and a set of normally open contacts 150 of relay 140; main control relay 170 and a set of normally open contacts 160 of timer motor relay 144; and timer motor 174 and a second set of normally open contacts 162 of timer motor relay 144. It will be apparent that pull-in of indexing motor relay 140 merely closes the set of contacts 150 to provide indexing drive power to indexing motor 154. Normally open contacts 160 prevent actuation of any steps in wash programs during indexing drive of controller drum 32. However upon sensing a program point, switch 44 changes to its second position, engaging contact 134, in which timer motor relay 144 is energized. This closes the contacts 162 to energize timer motor 174 and provide power to main control relay 170 via the closed contacts 160, while de-energizing the indexing motor.

Returning now to complete description of the circuitry shown in FIG. 4, a power indicator light 200 is connected between power bus 106 and power bus 92 in series with a current limiting resistor 204 and diode 206. Light 200 provides an indication that power is available for selection of specific programs and that the control circuitry for the machine is being powered.

Shown in a dotted line block generally designated 208 immediately below light 200 is circuitry for selection of a second program, "Program Selector No. 2". This circuitry is substantially identical to the circuitry of block 108 which defines Program Selector No. 1. For this reason, each of the elements in dotted line block 208 have been designated with the same reference numerals used to designate like elements of Program Selectors 1 and 2. Spring biased sensing switch 44' of block 208 will be laterally spaced so that its actuator finger 46' rides on a different one of the indexing tracks 34. The contours of that track, as in the case of the indexing track for Program 1, define Program 2. As an example, Program 2 could be a program having entirely different steps from Program 1. If so, the index points on the track for Program 2 would be positioned to define a zone on program surface 38 which had no area in common with the zone defined by the index points on the indexing track for Program 1. The contacts of switch 44' in block 208 are connected to relay 140 and relay 144 by means of connection to junction points 136 and 142 respectively. Connection between switch 44' and junction point 136 is made via a common conductor 210, which also provides connection for additional program selectors similar to Selectors No. 1 and 2, two of which are shown as blocks in FIG. 4 labeled program selector No. 3 and program selector No. k respectively. Similarly, the opposite contact of switch 44' is connected to junction point 142 by means of a common conductor 214 which provides this function for additional selectors.

It may occasionally be desirable to stop in the middle of a program, then subsequently advance drum 32 back to an initial or "ready" position defined by the point at which limit stop switch 45 interrupts power to the controller drum drive and control relays. This is accomplished in the embodiment shown by a program reset block generally designated 220. Located in reset block 220 and connected in series between bus 98 and power bus 92 are a reset switch 78, which may be a pushbutton switch, and a hold-in relay 222. Relay 222 has two pair of normally open contacts 224 and 226. Contacts 224 are connected between reset switch 78 and relay 222. Contacts 224 "hold-in" relay 222 upon release of pushbutton reset switch 78. Normally open contacts 226 are connected between junction point 230 and common conductor 210. Between sets of contacts 224 and 226 is a junction point 232. Connected in series between junction point 232 and a common conductor 236 which connects the indicator lights to current limiting resistor 128 are a diode 238 and indicator light 242.

It will be apparent from comparison of the circuit in block 220 and the circuit in block 108 or 208 that the only significant difference in block 220 is the lack of a single pole, double throw switch. The reason for its omission is that the reset switch needs only to energize the indexing motor to drive the drum to the limit stop. The indexing motor relay is then de-energized by limit stop switch 45.

The operation of a laundry machine using the preferred embodiment of applicants' invention as shown in FIGS. 1–5 will now be described. Assume first that a power switch (not shown) has been thrown to provide power to control power source 86. An operator selects one of the programs and pushes the appropriate program selection means or pushbutton switch which may be, for example, pushbutton switch 60 for selection of Program 1. Since timer motor relay 144 will not be initially energized, a set of normally closed contacts 94 thereof will be closed and power to relay 68 will flow through conductor 90, contacts 94 and pushbutton switch 60.

Energization of relay 68 will result in closing of normally open contacts 110 and 112. Contacts 110 and conductor 116 will then shunt around pushbutton switch 60 to "hold-in" relay 68 after release of switch 60 by the operator. Power will also be provided to common terminal 130 of sensing switch 44 through conductor 90, limit stop switch 45, cancel switch 100 and contacts 110 and 112 of relay 68. Actuation of pushbutton switch 60 enables spring biased switch 44 by providing power to its common terminal 130 so that changes in the state of the sensing switch associated with the depressed switch will be reflected in changes of energization at relays 140 and 144. Spring biased switch 44 will initially be in the position shown in FIG. 4, providing a conductive path between terminals 130 and 132, since drum 32 will be in a "ready" position after the end of a previous cycle. Switch 44 in this state provides a path for power to indexing drive relay 140. Pull-in of indexing drive relay 140 will close contacts 150 shown in FIG. 5 and provide power from secondary 182 to indexing motor 154. Indexing motor 154 will then rotate controller drum 32 at an indexing rate of speed until actuator finger 46 reaches an index point.

As previously mentioned, the index point corresponds to the beginning of the selected program. In the specific embodiment shown in the Figures, the index point is identified by a change in contour of the individual track 34 on which actuator finger 46 rides. The index point or change in track contour will result in a change of state of sensing switch 44. In its second state, sensing switch 44 will provide power to terminal 134 and timer motor relay 144 to which it is connected. This will pull-in relay 144. Relay 140 will drop out and therefore indexing drive by motor 154 will be discontinued. At the same time, normally open contacts 160 and 162 will close. This will provide conductive paths for power to pull in main control relay 170 and to drive drum 32 by means of timer motor 174. In addition, normally closed contacts 94 of relay 144 will open. This eliminates the possibility of inadvertent actuation of an alternate program during the laundry machine's performance of the program already selected.

The closing of contacts 160 will enable control relay 170 to pull-in. Control relay 170 will then enable the switches controlled by individual tracks on program surface 38 to respond to the information encoded on those tracks and to perform the steps in the selected wash program (Program 1). Upon completion of those steps, actuator finger 46 of spring biased switch 44 will encounter a second index point which, in the case of the present embodiment, will be a change in contour of the track causing it to return to its first state, energizing indexing drive relay 140 and dropping out timer motor relay 144. Contacts 160 and 162 will open, disconnecting main control relay 170 and timer motor 174 so that no further wash steps will be performed. Energization of the indexing motor relay will again provide power to indexing drive motor 154 which will drive through the remainder of the program surface until limit stop switch 45 reaches its limit position, disengaging power to the indexing drive relay.

The performance of individual programs by each of the other program selector circuits will be similar to that of Program Selector No. 1, with the exception that each program selector has a separate spring biased sensing switch which rides on an indexing track 34 on which a program is defined by the zone between the index points thereon.

Under certain circumstances, it may be desirable to cancel a program during an intermediate point in its performance. If so, depression of cancel switch 100 will disconnect power from the hold-in relay for the selected program. This will disenable the sensing switch and remove energization from common terminal thereof so that neither timer motor relay 144 nor indexing drive relay 140 will be energized. This will stop drum 32 and the machine will cease performing program steps.

The circuitry of block 220 provides a capability to reset the program surface after cancellation has occurred without using a complicated procedure or cycling the laundry machine through undesired steps. The operator first depresses the pushbutton switch 78. Since relay 144 will not be energized, power will be provided through normally closed contacts 94, power bus 98 and pushbutton switch 78 to relay 222. Relay 222 pulls in, closing sets of contacts 224 and 226. Power then flows through power bus 106, contacts 224 and junction point 230 to hold-in relay 222. In addition, power flows through contacts 224, 226 and common conductor 210 to indexing drive relay 140. Relay 140 closes contacts 150 to the indexing motor to drive drum 32 until limit stop switch 45 is reached. Since there is no equivalent to sensing switch 44 in block 220, relay 144 is not energized. Therefore contacts 160 remain open and the switches associated with the program surface are not enabled.

Although the present invention has been described in terms of programming and indexing surfaces defined on the exterior surface of a circular cylindrical drum, it will be understood by those of skill in the art that the invention is not limited to use with a cylindrical drum or sensing switches which respond only to variations in contour on indexing and program surfaces. Alternatively, the sensing switches might be photodiodes capable of sensing variations in the reflectivity on the individual indexing tracks. These variations in reflectivity would be used to define index points for the beginning and end of a program. Another possibility would be to make portions of the indexing track conductive and other portions nonconductive, thereby defining the extent of a program on the track using conductivity.

It is not critical to the present invention that the indexing drive re-engages and drives the drum to an initial position defined by a limit stop each time a selected program is complete. Alternatively, it would be possible to have limit stops associated with each of the individual program indexing tracks to disconnect power therefrom after the program has run its course. When selection of the next program was made, the indexing drive could then drive from the end of the last program used to the point at which the selected switch reached its first index point.

In addition, the embodiment shown and described has program and indexing surfaces comprising a plurality of individual tracks on a circular cylindrical drum. Such a drum may be constructed by clamping or fastening together a number of individually cut discs which define the tracks having information to which individual sensing switches respond by cutting grooves in a solid drum. On the other hand, it would be possible to substitute a continuous movable band or chart for the drum. Such a band would rotate or move with respect to the sensing switch head in response to drive from either the indexing motor or the timer motor.

It will also be understood that it is not necessary to use normally open contacts on the timer motor relay to prevent the main control relay from driving the laundry machine through unwanted steps on the program surface. Normally closed contacts on the indexing drive relay or any other apparatus which prevents the sensing switches for the program surface from driving the machine until the selected zone is reached would work equally well.

It will be further understood that it is not essential to the present invention that a momentary contact pushbutton program selector switch and holding relay be used for program selection. Pushbutton switches with mechanical latches and interlocks and a mechanically operated cancel switch or any other functional equivalent could as well be used.

Other modifications of the invention will be apparent to those skilled in the art in light of the foregoing description. The description is intended to provide concrete examples of individual embodiments clearly disclosing the present invention. Accordingly, the invention is not limited to any particular embodiment. All alternatives, modifications and variations of the present invention which fall within the spirit and broad scope of the appended claims are covered.

We claim:

1. Wash program controller apparatus for a laundry machine of the type having a plurality of subsystems each operable to perform a unique laundering function, comprising:

a. means for automatically activating said plurality of subsystems to execute a plurality of distinct laundering programs, comprising:

i. first triggering apparatus defining an encoded movable program surface continuously disposed in the direction of movement thereof, having a plurality of laterally spaced tracks each encoded with triggering elements of varied lengths in said direction of movement, wherein each of said plurality of triggering elements is identifiable with at least one of the unique laundering functions and, wherein said triggering elements of said program surface occupy zones of varying extent in said direction of motion with those said triggering elements within each zone being identifiable with a different one of said distinct laundering programs;

ii. control means operatively connectable to the plurality of subsystems and disposed to survey a portion of said encoded program surface tracks for activating responsive to movement of said triggering elements thereof said plurality of subsytems in sequential time dependent manner; and iii. first drive means for advancing said encoded program surface relative said control means at a first rate of speed so that said control means actuates the plurality of subsystems in sequential time dependent manner; and b. indexing means for automatically synthesizing said plurality of distinct laundering programs by selecting for execution various combinations of the plurality of laundering functions, comprising:

i. second triggering apparatus defining an encoded movable indexing surface continuously disposed in the direction of movement thereof, having a plurality of laterally spaced indexing tracks each encoded with at least one index element, said one index element of each of said indexing tracks having a predetermined positional relationship on said indexing surface corresponding to the beginning of a different one of said zones of said program surface;

ii. a plurality of sensing means, each operatively disposed relative said indexing surface to survey a different one of said indexing tracks, for sensing when activated said index elements of its surveyed track;

iii. second drive means for advancing when activated said indexing surface relative said plurality of sensing means;

iv. program selection means having a plurality of input selector means each operatively connected with a different one of said sensing means and identifiable with a different one of said laundering programs for activating in response to energization of one of said input selectors the associated single one of said sensing means and for activating said second drive means, thereby automatically advancing said indexing surface relative said sensing means until said activated sensing means senses said one index element of its surveyed indexing track, indicating the beginning of the selected laundering program zone; and v. switching means responsive to the sensing of said one index element by said activated sensing means for deactivating said second drive means, for activating said first drive means and for actuating said control means to respond to said triggering elements within that zone defined by said sensed one index element, to execute the selected laundering program.

2. The apparatus of claim 1 including means for physically connecting said second means and said first means so that said program surface and said indexing surface move together, and wherein said first and second drive means are each connected to advance simultaneously said program surface and said indexing surface.

3. The apparatus of claim 2 wherein said program selection means includes a power source and plurality of selector switches connected in electrical parallel thereto, with each of said selector switches being operatively connected to a different one of said input selector means for activation thereby; wherein said plurality of sensing means includes a plurality of sensing switches each of which is operatively aligned with a different one of said indexing tracks and is responsive to said index elements thereon to switch between first and second states, each of said sensing switches being connected in series to a different one of said selector switches so that actuation of a particular selector switch activates its associated sensing switch by connection of said power source thereto.

4. The apparatus of claim 3 wherein each of said sensing switches is connected so that, when activated and operative in its said first state, it provides a conductive path for energization of said second drive means to drive said movable program surface at a second rate of speed, faster than said first rate of speed, and when activated and operative in its said second state, provides a conductive path for energization of said first drive means.

5. The apparatus of claim 4 wherein said second drive means includes a drive motor for driving said first and second triggering apparatus and wherein said switching means comprises a first relay operatively connected for energization by said sensing switches when one of said sensing switches is activated in said first state, said first relay having a set of normally open contacts operatively connected for providing power therethrough to said drive motor during energization of said first relay.

6. The apparatus of claim 5 wherein said switching means includes a second relay connected for energization by said sensing switches when one of said sensing switches is activated in said second state, said second relay having a first set or normally open contacts operatively connected for providing power to said first drive means during energization of said second relay.

7. The apparatus of claim 6 wherein said second relay has a second set of normally open contacts operatively connected for providing actuation power to said control means during energization of said second relay.

8. The apparatus of claim 7 wherein said control means includes a control relay connected to said second set of normally open contacts of said second relay and a plurality of individual program switches at least one of said program switches being operatively aligned with each of said spaced tracks of said program surface each of said program switches being responsive to movement of said triggering elements within its associated said program surface track to control at least one of said laundry machine subsystems for performing the associated ones of said unique laundering functions when activated by said control relay.

9. The apparatus of claim 4 wherein each of said indexing tracks is contoured with areas of differing height, wherein said sensing switches are characterized by contact fingers spring-biased to follow said track contours and to switch said sensing switches between their said first and second states in response thereto, and wherein said index elements are defined by changes in said track contours.

10. The apparatus of claim 9 wherein each indexing track has a contour characterized by a first segment of a first height which occupies a portion of the track length and a second segment of a second height different from said first height which occupies the remainder of the track length with transition portions between said first and second segments whose positional relationship to said program surface defines the beginning and end of the laundering program corresponding thereto.

11. The apparatus of claim 9 wherein said first triggering apparatus and said second triggering apparatus comprise a cylindrical member mounted for rotation about its longitudinal axis, and wherein said program surface and said indexing surface comprise axially spaced portions of the exterior surface of the cylindrical member.

12. The apparatus of claim 11 wherein said second triggering apparatus further comprises a sheet of material bearing said encoded indexing elements and means for removably mounting said sheet to the external surface of said cylindrical member to define said indexing surface.

13. The apparatus of claim 12, wherein said sheet contains a plurality of slots defining said plurality of encoded indexing elements and wherein said contact fingers of said sensing switches engage one surface of said sheet and are operatively activated by said slots.

14. The apparatus of claim 9, wherein each of said indexing tracks has a contour characterized by a first segment of a first height which occupies a portion of the respective track length and a second segment of a height different from said first height which occupies the remainder of the respective track length, and wherein said contact fingers of said sensing switches include sloped portions engaging respective ones of said indexing track contours for causing said sensing switches to gradually respond to transition portions of said contours of said indexing tracks between their said first and second segments.

15. The apparatus of claim 9, wherein said second triggering apparatus further comprises a sheet of material bearing said encoded indexing elements and means for mounting said sheet for operative movement relative said plurality of sensing means.

16. In fabric washing apparatus having a program band having a continuous program surface encoded with a plurality of program triggering elements occupying zones of varying extent about the program surface each of the program triggering elements being associated with at least one laundering function, and control means operatively connected to survey the continuous program surface and being responsive, when activated, to the encoded program triggering elements to cause said washing apparatus to sequentially preform selected ones of the laundering functions in time dependent manner as the program band is advanced, the improvement comprising:
 a. a continuous indexing band connected to said program band to advance therewith, said indexing band being divided into a plurality of laterally spaced tracks extending longitudinally about said band, each of said tracks being characterized by indexing elements thereon marking the start and end of a different laundry program defined by the program triggering elements representing laundry functions encoded within one of the zones on said program band whose longitudinal extent corresponds to the spacing of said indexing elements within that associated track and has a predetermined longitudinal position with respect thereto;
 b. a plurality of individual sensing means each operatively mounted in fixed position relative a different one of said tracks and disposed to survey a small area of its associated said track, for sensing when energized said indexing elements of its associated said track within said surveyed area thereof;
 c. a plurality of manually operated input selector switching means, one each of said selector switching means being operatively connected with a different one of said sensing means, for selectively energizing in response to manual stimulation thereof said sensing means, each of said switching means being operative upon stimulation thereof to energize a different one of said sensing means;
 d. motor means, responsive to energization of any one of said sensing means, for moving said indexing band relative said sensing means;
 e. means, responsive to each of said sensing means for activating the control means upon the sensing of one of said indexing elements by any one of said energized sensing means; and
 f. timer means, responsive to each of said energized sensing means upon the sensing thereof of their respective said indexing elements for moving said program band relative said control means in time dependent fashion to sequentially execute the laundering functions of the selected said laundry program.

17. The apparatus of claim 16 wherein said plurality of individual sensing means comprise a plurality of single pole, double throw sensing switches, each having a first and a second throw terminal and a common terminal, wherein said motor means includes an indexing drive relay operatively connected to said first terminal of each of said sensing switches, wherein said timer means includes a timer relay operatively connected to said second terminal of each of said sensing switches, and wherein said common terminal of each of said sensing switches is operatively connected for energization by one of said manually operated input selector switching means.

18. The apparatus of claim 17 wherein each of said sensing switches further has an actuator lever riding in contact with an associated one of said tracks, each of said levers being responsive to the indexing elements encoded on its associated track to switch the sensing switch associated therewith.

19. The apparatus of claim 18 wherein said indexing elements are defined by variations in the contour and height of said tracks.

20. The apparatus of claim 17 wherein said plurality of manually operated input selector switching means comrpise a plurality of individual pushbutton switches, a power source, operatively connected with each of said pushbutton switches, and means for connecting said common terminal of each of said sensing switches to said power source through a different one of said pushbutton switches.

21. The apparatus of claim 20 wherein said plurality of manually operated input selector switching means further includes a plurality of hold-in relays each associated with a different one of said pushbutton switches for energization therethrough, each of said hold-in relays having a set of normally open contacts operatively connected in parallel with its associated pushbutton switch.

22. The apparatus of claim 20 wherein said timer relay further has a pair of normally closed contacts and wherein said power source is operatively connected to said plurality of pushbutton switches through said pair of normally closed contacts of said timer relay.

23. In a laundry machine control system of the type having a laundry cycle controller including first means defining a continuous movable program surface encoded with a plurality of laterally spaced groups of laundry function triggering elements occupying zones of different lengths in the direction of movement of the program surface, with the zone lengths being dependent upon the desired execution time for the associated laundry function, timing means for advancing the encoded program surface relative a sensing area, and sensing control means for surveying the program surface at the sensing area and responsive to the encoded triggering elements to sequentially drive a laundry machine through the laundry functions at a rate dependent upon the speed of movement of the program surface, laundry program indexing and selection apparatus for automatically synthesizing distinct laundry programs from selected ones of the laundry function, comprising:
  a. second means defining a continuous movavle indexing surface, operatively subdivided into a plurality of laterally spaced program tracks, each track having a portion of its total length encoded with indexing elements of varied lengths in predetermined position relative selected ones of the laundry function indexing elements of the program surface and defining a different laundry program of related extent on the program surface;
  b. means operatively connecting said second means for simultaneously advancing said indexing surface for movement with said program surface by the timing means;
  c. a plurality of switching means one each of said switching means being positioned relative a different one of said indexing tracks for sensing said encoded indexing elements thereof each of said switching means being normally operative in a first state and being operable in response to detection of said indexing elements in its associated track to change from said first state to a second state in response thereto when the sensed indexing element has a particular positional relationship to its associated switching means;
  d. program selection means for providing power to a selected one of said switching means associated with a desired program track:
  e. indexing drive means connected to said plurality of switching means, and responsive to the selected energized one of said switching means for advancing said program and indexing surfaces at a first rate of speed when the selected energized switching means is in its said first state;
  f. means operatively connected to said plurality of switching means for preventing the sensing control means from driving the laundry machine while said selected switching means is operative in its said first state; and
  g. means responsive to an energized switching means operative in its said second state for energizing said timing means, whereby said first and said second means are driven at a second slower time dependent speed while indexing element bearing portions of said program track are in said particular positional relationship to said energized switching means.

24. The appatatus of claim 23 wherein said energized switching means resumes operation in its said first state to drive said indexing drive means after the sensed indexing element of the track associated therewith moves past said energized switching means, and wherein said apparatus includes limit stop means for de-energizing said indexing drive means after all triggering elements encoded on the program surface have passed said sensing means.

25. The apparatus of claim 24 wherein said indexing surfaces includes a limit stop track laterally spaced from said program tracks having a limit stop indexing element thereon, and wherein said limit stop means includes a stop switch operatively mounted in proximity with said limit stop track, responsive to sensing of said limit stop index element to de-energize said indexing drive means.

26. The apparatus of claim 23 wherein the laundry cycle controller of the laundry machine control system is of the type characterized by said first means comprising a generally cylindrical drum having a first continuous band connected about its external surface and defining the program surface, wherein said laundry function triggering elements encoded on said first band occupy zones of different arc lengths thereon, wherein the timing means rotates the cylindrical drum about its longitudinal axis, and wherein the laundry program indexing and selection apparatus is further characterized by said second means comprising a continuous indexing band connected about the surface of said cylindrical drum and forming said indexing surface and means for removably mounting said indexing band to the external surface of said cylindrical drum.

27. The apparatus of claim 23 wherein said second means comprises a sheet of material defining said continuous movable indexing surface and bearing said encoded indexing elements, and means for mounting said sheet for operative movement relative said plurality of switching means.

28. The apparatus of claim 27, wherein said sheet contains a plurality of slots defining said encoded indexing elements and wherein each of said switching means includes a switching arm disposed to engage one surface of said sheet and movable in response to engagement of said slots therein to operate their respective said switching means.

* * * * *

UNITED STATES PATENT OFFICE
CERTIFICATE OF CORRECTION

PATENT NO. : 3,937,981
DATED : February 10, 1976
INVENTOR(S) : Marcus I. Nystuen, et al It is certified that error appears in the above-identified patent and that said Letters Patent are hereby corrected as shown below:

In column 2, line 39, "those portion" should read --those portions--.

In column 13, claim 16, line 61, "preform" should read --perform--.

In column 15, claim 23, line 33, "movavle" should read --movable--.

The figures of the Drawing should be corrected as illustrated in the attached photostatic copy as follows:

- Fig. 1 should be corrected to insert numeral --21-- to refer to the toggle switches, illuminated lights and pushbuttons on the operator panel member, and numeral --100-- should be added to designate the cancel switch on the side of the operator panel;

- Fig. 2 should be amended to include the reference numeral --21-- to refer to the toggle switches, the illuminated lights, and the pushbuttons on the left side of the operator panel; a lead line should be drawn from the numeral "32" to indicate the controller drum; the numeral designator --34-- and appropriate lead lines should be inserted to refer to the individual contour tracks of the controller drum 32; lead line designations should be added with respect to the numerals "36" and "38" to indicate the "indexing" and "program" surface portions respectively of the controller drum 32; Reference numeral --37-- should be added with appropriate lead line to designate the dotted line differentiating the program and indexing surfaces of the controller drum 32; and a portion of the switch head "42" should be broken away to indicate the limit switch "45" mounted above the controller drum 32;

UNITED STATES PATENT OFFICE
CERTIFICATE OF CORRECTION

PATENT NO. : 3,937,981
DATED : February 10, 1976
INVENTOR(S) : Marcus I. Nystuen, et al It is certified that error appears in the above-identified patent and that said Letters Patent are hereby corrected as shown below:

- Fig. 3 should be amended to add the reference numeral --32-- and appropriate lead line to designate the controller drum; and reference numeral --34-- and appropriate lead line should be added to designate the track surface of the drum 32; and

- Fig. 4 should be amended to include the reference numeral --222-- and appropriate lead line to indicate that relay physically located in the schematic diagram of Fig. 4 immediately below the indicator light 124'.

Signed and Sealed this

Twenty-second Day of March 1977

[SEAL]

Attest:

RUTH C. MASON
*Attesting Officer*

C. MARSHALL DANN
*Commissioner of Patents and Trademarks*